United States Patent
Castell

[15] 3,642,499
[45] Feb. 15, 1972

[54] METHOD OF PACKING COOKED FOOD PRODUCTS

[72] Inventor: Juan Morato Castell, 8 Merced St., Barcelona 8, Spain

[22] Filed: June 26, 1969
[21] Appl. No.: 836,854

[52] U.S. Cl..........................99/171 CP, 99/171 H, 99/182, 206/46 F
[51] Int. Cl..................................................B65b 3/00
[58] Field of Search ..................99/171 R, 171 CP, 174, 187, 99/269, 239; 206/46 F, 47 A

[56] References Cited

UNITED STATES PATENTS

| | | | |
|---|---|---|---|
| 2,489,616 | 11/1949 | Buttery | 206/46 F X |
| 672,994 | 4/1901 | Wacker | 99/269 |
| 1,084,114 | 1/1914 | Scheier | 99/171 |
| 1,617,692 | 2/1927 | Villar | 99/187 X |
| 3,237,549 | 3/1966 | Pospischil | 99/187 |
| 3,380,592 | 4/1968 | Arnold | 99/171 X |

*Primary Examiner*—Frank W. Lutter
*Assistant Examiner*—Steven L. Weinstein
*Attorney*—Michael S. Striker

[57] ABSTRACT

A method of packing food having a liquid component and a solid component in a heatable container compartmented by a perforate wall to enable evacuation of the liquid component selectively and independently of the solid component.

3 Claims, 5 Drawing Figures

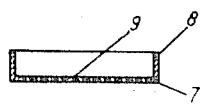
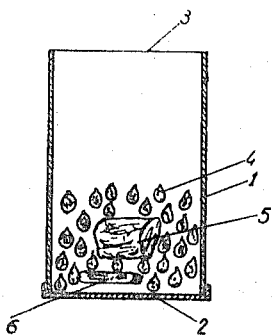
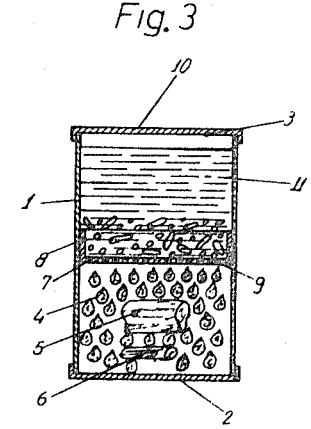
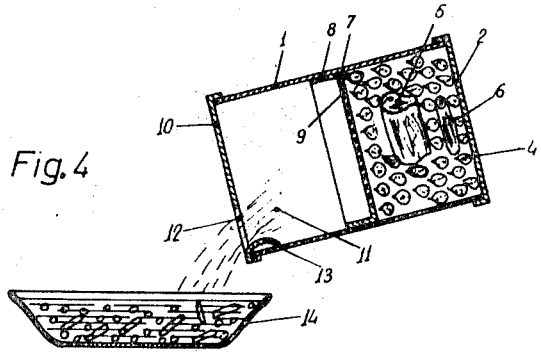
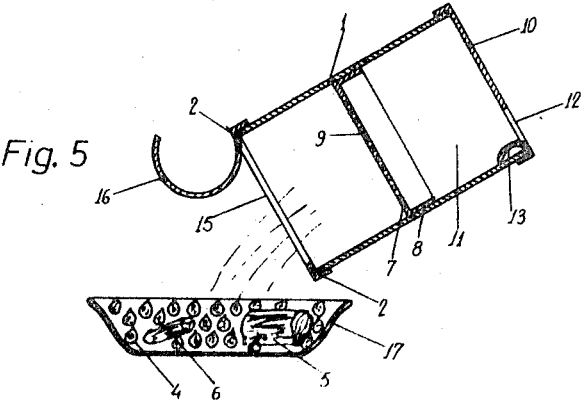

METHOD OF PACKING COOKED FOOD PRODUCTS

The present invention relates to a method of packing cooked food products and a container for containing such food products and, more particularly, to those food products, either prepared or cooked, containing a liquid portion and a solid portion or portions, denominated broths or sauces, which method and container permit, at the very moment that this food is going to be consumed, the easy separation of the solid portion or portions from the liquid portion, in order to be consumed separately, that is, first the liquid portion and then the solid portion or portions.

Generally, foods, already cooked or prepared are packed in a metallic container, so conditioned that the cooked food can be consumed some time after the date on which it was prepared. This well-known method requires the previous preparation of food products on an industrial scale. By this method, the containers are filled and tightly sealed, and finally the containers, already full, are sterilized and labeled, putting them in a condition to be sold.

For the consumption of this food, the container is heated in water and then, it is opened, and its contents are poured onto a dish, but it is not possible to easily separate the liquid portion or broth onto one dish, and the solid portion or portions making up the cooked food, onto another dish; therefore, the containers are not suitable for cooked food in which the liquid portion is of the so-called broth type, susceptible to being mixed with soup pastes, which, as is customary, are eaten separately prior to the remaining solid or semisolid matters completing the cooked food.

It is an object of this invention to provide a method by which the portions of cooked food composed of a liquid portion and an other solid portion, which, suitably packed together, can be separated.

It is another object of this invention to provide a type of container which is suitable for carrying out the method, which will allow the partial emptying, first of the liquid portion of the food, and then the solid portion of the same cooked food.

Yet another object of this invention to provide a container which, in addition, can be filled with the appropriate ingredients of the food to be cooked and to produce the cooking within the closed container.

Yet another object of this invention is to provide a container fitted with containing spaces, separate from one another, one of these spaces containing the solid portion of the food, and the other containing the liquid portion, within which container the liquid portion can fill the space containing the solid portion, but impeding that this solid portion can fill the part of the container destined to contain the liquid portion.

These and other objects will be clearly revealed during the description which is given below with reference to the attached drawings, all of it referring to a case of possible realization of the method and container which constitute the object of this invention.

FIG. 1 shows the container, as seen sectionally through an axial plane, containing solid foods.

FIG. 2 shows the same container, but with the separator already placed in position.

FIG. 3 shows the same container already loaded with the liquid content and duly closed.

FIG. 4 shows the container after being heated, open on the side containing the liquid portion, ready to pour the liquid or broth onto a dish.

FIG. 5 is similar to FIG. 4, but in the action of pouring the solid contents of the container onto another dish.

The packing method consists, essentially, of cooking the food product containing solid matters and liquid matters, such as broths in large amounts capable of then filling a large number of containers with it. Once the food product has been cooked or prepared, the sauce or broth is separated from the solid matter when the broth is to be consumed with the addition of any soup paste, and they are kept apart or not when the broth is not to carry such an addition of soup paste.

In both cases, a cylindric container -1-, which is closed at one of its two ends by the cover -2-, which is welded or fastened by an other system causing the tight union of cover and container, the other end -3- of the same cylindrical container -1- remaining fully open. In this condition, the solid matter such as chickpeas -4-, portions of pork and meat -5- and portions of smoked pork sausage -6-, are poured into the container -1-, and by placing the container in vertical position, the separating piece -7-, which is a metallic plate having a peripheral flange -8- and fitted with a plurality of orifices -9- made on the flat side -7-, is placed into position, the outside diameter of the peripheral flange -8- being similar or slightly larger than the inner diameter of the container -1-, in order that this separating plate enters and fits tightly into this container. This separating plate is pushed into the container until contacting or resting very near to the solid food previously deposited, as shown in FIG. 2, and then the soup paste is placed on the separating piece -7- and thereafter the container is filled with the broth, which, as the separating piece -7- has orifices -9-, passes freely and completely covers all the solid matters, which are submerged in this broth, then the cover -10- is fixed, sealing the opening -3-, which was open, thus obtaining a tightly sealed container, containing a complete food product, that is, the solid matter and the broth. The two covers -2- and -10- are identical to each other, except that No. -2- carries a mark showing that it belongs to the side of the container containing the solid matters, and the other cover -10- carries a different mark showing that it corresponds to the side or part of the container containing the liquid.

Once the packing has been carried out as above, the container is in a condition to be sold, and for its use, it is sufficient to heat it in water, as known, and then the cover -10- is punched to provide an opening -12-, the torn portion -13- remaining bent towards the inner wall of the container -1- and then the latter is inclined over the dish -14- see FIG. 4, so that the broth and the soup paste previously deposited in zone -11-, will be discharged but the solid matter -4-5-6- will not fall out, because they are stopped from doing so by the separating plate which, due to the fact that it has the orifices -9- on it, allows the broth to freely pass through it.

Once the broth and soup paste have been poured onto a dish, as mentioned above, the container is turned over and the other cover -2- is cut or torn, totally or partially, which, for example, remains rolled as shown at -16- and allows an ample opening -15-, and, thus by turning the container onto another dish -17-, as shown in FIG. 5, all solid matter -4-5-6- will fall onto this dish.

In case of the broth not carrying soup paste, that is, when it is to be consumed alone, the same container as described above is provided but, prior to filling it, the separating piece -7-8-9- is located about half way up the container, or less; then, the full food product is poured through the open end -3-, that is, both the broth and solid matter, and once the container has been filled, it is sealed with the cover -10-. In this case, the lower cover -2- will have the mark corresponding to the side of container which, when being opened, will permit only the broth to be poured, and, on the contrary, the opposite cover -10- will bear the mark showing that, when opening it, the solid matters will be poured.

It is obvious that with this same container, it is possible to cause the filling or loading of raw solid and liquid matters, that is, uncooked or unprepared, or semicooked, and after closing the container, the cooking is completed by heating in a pressure cooker or by any other method well known in the culinary art.

What I claim is:

1. A method of packing in a heatable heat-resistant container precooked food which contains solid and liquid components and is to be heated in such container, comprising a step of placing the liquid component of said food into a heatable heat-resistant container having an open end and a closed end; a step of placing into said container the solid component of said food; a step of introducing into said container an apertured plate and press fitting said plate in a position in which the plate is spaced from both ends of said container so as to divide the interior of said container into two compartments communicating with each other through the apertures of said plate, one of said steps preceding the other two of said steps; closing the open end of said container; and marking at least one of the ends of said container to indicate which of the compartments contains said solid component so that, by first opening said container at that end which is remote from the compartment containing said solid component, said liquid component can be evacuated independently of said solid component.

2. A method as defined in claim 1, wherein said step of press fitting said plate in position spaced from both ends of said container is carried out before said step of placing said liquid component into said container and subsequent to the step of placing said solid component into said container so that said liquid component can pass through the apertures of said plate and said solid component is retained by said plate.

3. A method as defined in claim 1, wherein said step of press fitting said plate in position spaced from both ends of said container is carried out after said steps of placing said solid and liquid components into said container so that the liquid component can pass through the apertures of said plate.

* * * * *